United States Patent [19]

Ishikawa

[11] 4,163,428
[45] Aug. 7, 1979

[54] INDICATOR GAUGE WITH ILLUMINATED POINTER

[75] Inventor: Masao Ishikawa, Yokohama, Japan

[73] Assignee: Nissan Motor Company, Limited, Yokohama, Japan

[21] Appl. No.: 933,618

[22] Filed: Aug. 14, 1978

[30] Foreign Application Priority Data

Sep. 9, 1977 [JP] Japan .................. 52/107969

[51] Int. Cl.² .............................................. G09F 9/00
[52] U.S. Cl. ...................................... 116/288; 362/29
[58] Field of Search ............... 116/37, 47, 48, 129 R, 116/129 L, 129 P, 129 F, DIG. 5, DIG. 6, DIG. 35, DIG. 36; 362/23, 26, 28, 29, 30, 55

[56] References Cited

U.S. PATENT DOCUMENTS

| 2,203,514 | 6/1940 | Bacon .................................... 362/29 |
| 2,914,021 | 11/1959 | Blackwell et al. ................ 362/29 X |
| 2,945,145 | 7/1960 | Neugass ...................... 116/DIG. 35 |
| 3,129,691 | 4/1964 | Walker ............................ 116/129 L |
| 3,559,616 | 2/1971 | Protzmann ...................... 116/129 L |
| 3,568,630 | 3/1971 | Blackwell ...................... 116/129 R |

Primary Examiner—Donald Watkins
Attorney, Agent, or Firm—Schwartz, Jeffery, et al.

[57] ABSTRACT

An indicator pointer is arranged between a dial board and a viewing window so as to swingably move over the face of the dial board in response to rotation of a spindle of a movement of the indicator gauge. Illuminating means such as a light emitting diode (LED) is disposed in the pointer to illuminate a relatively large portion of the pointer. Opaque paint is coated on the front surface of the pointer to conceal the illuminating means.

8 Claims, 4 Drawing Figures

INDICATOR GAUGE WITH ILLUMINATED POINTER

FIELD OF THE INVENTION

The present invention relates in general to an illuminated indicator gauge, such as speedometer and tachometer for a motor vehicle, and more particularly to such a gauge having an illuminated pointer.

BACKGROUND OF THE INVENTION

Since many indicator gauges are used in surrounding which receive very little light, either naturally or artificially, various arrangements for achieving easy read of the gauges have been proposed. One of these conventional arrangements is an arrangement using an illuminated pointer, which, as has been disclosed in Japanese Utility Model Publication No. 52-43447, comprises a light emitting diode or the like set in the top portion of a swingable indicator pointer, and a pair of dangling lead wires or the like leading from the diode to a suitable electric power source which is positioned apart from the gauge power. However, in such type arrangement, there arises a problem in that the swingable movement of the pointer can not be smoothly made because of obstruction by the dangling lead wires. In fact, this problem becomes most critical in a use with an addy-current type gauge since sufficient torque is not given from this type gauge. Although the movement of the pointer may become somewhat smooth by thinning the wires, the mechanical strength of these elements is reduced from the very nature of things, causing high probability of breakage of the same. The dangling of the wires will also cause the pointer to have a very limited swing range. Furthermore in the disclosed Publication, light rays from the luminous diode form a so-called point source of light which glitters, dazzling driver's eyes.

SUMMARY OF THE INVENTION

Accordingly, an essential object of the present invention is to solve the problems encountered in the above-mentioned conventional indicator gauge.

An object of the present invention to provide an indicator gauge having an indicator pointer which is effectively illuminated to be easily noticed.

Another object of the present invention is to provide an indicator gauge having an indicator pointer which can smoothly and sensitively move when urged by a movement of the gauge.

According to the present invention, there is provided an indicator gauge having spindle of a movement, a dial board substantially perpendicular to the spindle, and a viewing window in front of the dial board, the indicator gauge comprising: an indicator pointer of a transparent material arranged between the dial board and the viewing window, the pointer being formed with first and second surfaces which respectively face the dial board and the viewing window, the first surface being matted; illuminating means disposed in the pointer for emitting light rays which are directed toward the matted first surface; connecting and current transmitting means for connecting an end of the pointer with the spindle to move the pointer over the face of the dial board in response to rotation of the spindle about the axis thereof and also transmitting current which flows between the illuminating means and an electric power source; cover means affixed to the second surface of the pointer for concealing the illuminating means.

BRIEF DESCRIPTION OF THE DRAWINGS

Other objects and advantages of the present invention will become apparent from the following description when taken in conjunction with the accompanying drawings, in which.

DESCRIPTION OF THE EMBODIMENTS

Figure 1:
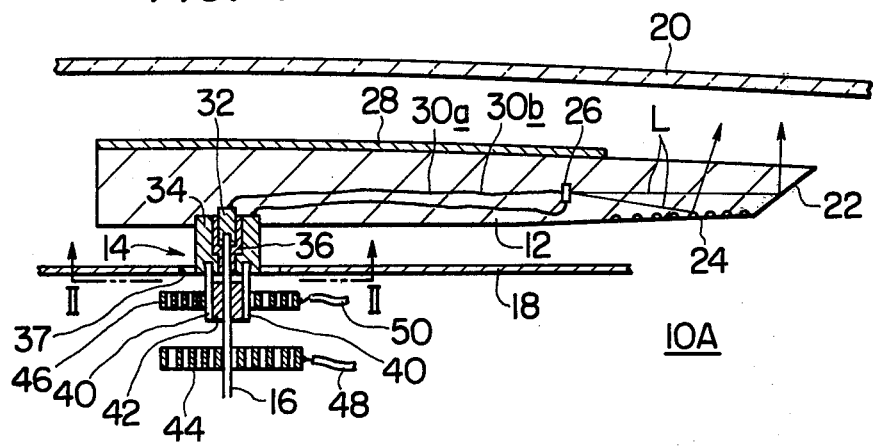
FIG. 1 is a schematical sectional view of an embodiment of an indicator gauge according to the present invention.

Referring to FIG. 1, there is illustrated an indicator gauge 10A which is the first embodiment of the invention. The gauge 10A generally comprises an indicator pointer 12, a connector 14 for connecting the pointer 12 with a spindle 16 of a movement (not shown), a dial board 18 on which a scale of indicia is marked and a transparent viewing window 20 located in front of the pointer 12.

The indicator pointer 12 is made of a transparent or a semi-transparent material such as acryl resin or polycarbonate resin and is located between the viewing window 20 and the dial board 18 so as to move over the face of the dial board 18 adjacent to the scale of the indicia in a manner as will be described hereinlater. The pointer 12 is formed with an inclined top section 22 at one end thereof and has at a rear surface thereof facing the dial board 18 matted finish 24. A light emitting diode (LED) 26 or the like is disposed in a portion of the pointer 12 to cast light rays L radially outwardly, that is toward the top of the pointer, when electrically energized. The front surface of the pointer 12 except the top end portion there of is coated with dark or opaque paint 28 so as to conceal the luminous diode 26 from a view taken from the outside of the viewing window 20. First and second lead wires 30a and 30b are spacedly disposed in the pointer 12 to lead from the luminous diode 26 toward the other end of the pointer 12 to which the connector 14 is fixed in a manner as will be described hereinnext.

Figure 2:
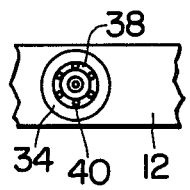
FIG. 2 is a view taken along the line II—II of FIG. 1.

The connector 14 comprises coaxially arranged first and second conductive cylindrical members 32 and 34 which are tightly disposed in a recess (no numeral) formed in the other end of the pointer 12, as shown. Denoted by numeral 36 is a tubular insulating member which is tightly disposed in a cylindrical clearance defined between the first and second cylindrical members 32 and 34. The first cylindrical member 32 is connected to the first lead wire 30a and mounted on a leading end of the spindle 16 of the movement in such a manner that the pointer 12 is substantially perpendicular to the spindle 16. Denoted by numeral 37 is an opening which is formed in the dial board 18 for spacedly receiving therein the connector 14. As will be understood from FIG. 2, the exposed end of the second cylindrical member 34 is formed with an annular groove 38 which is concentric with the spindle 16. The groove 38 tightly receives therein enlarged head portions of a plurality of pins 40 (six in the embodiment) which are evenly spaced from each other and extend parallel to the spindle 16. A tubular insulating member 42 is concentrically disposed about the spindle 16 so as to put the pins 40 on the cylindrical surface thereof. First and second spiral springs 44 and 46 are disposed around the spindle 16 and are respectively fixed at their inside ends to the spindle 16 and any or all of the pins 40 in a conventional manner. The outside ends of the spiral springs 44 and 46 are respectively connected to first and second load cables 48 and 50 which lead to a suitable electric power source (not shown). If desired, the outside ends of the spiral springs 44 and 46 may be fixed to an insulating support member (not shown) extending from a stationary member such as the dial board 18. In this case, it is preferable to arrange the springs 44 and 46 to produce against the spindle 16 respective biasing forces which induce opposed rotations of the spindle 16 about the axis thereof. It should be thus appreciated that the rotation of the spindle 16 of the movement directly causes the swingable rotation of the pointer 12 about the axis of the spindle 16 because of the connection therebetween made by the connector 14. Although, during the rotation of the pointer 12, slight winding and/or stretching takes place on the spiral springs 44 and 46, such movements of the springs will not produce so much force considerably obstructing the rotation of the pointer 12 by the nature of the spiral spring.

With this, when the luminous diode 26 is energized to light, light rays from the diode 26 are reflected forwardly at the matted finished back face and partially at the inclined top section 22 in a manner as indicated by the lines "L". By the provision of the paint 28, light rays directly forwardly emitted from the diode 26 are completely blocked thereby protecting the passenger or driver from the unwanted glittering light.

Figure 3:
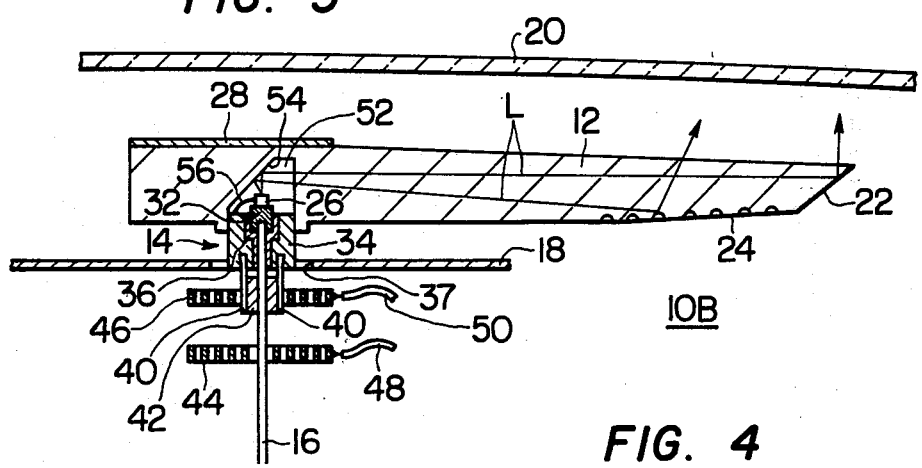
FIG. 3 is a view similar to FIG. 1, but shows an alternative embodiment of an indicator gauge according to the invention.
Figure 4:
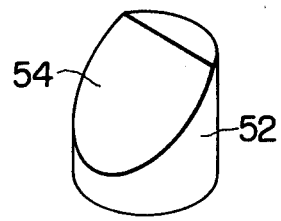
FIG. 4 is a view showing the shape of a blind bore formed in the pointer shown in FIG. 3.

Referring to FIG. 3, there is illustrated an indicator gauge 10B which is the second embodiment of the invention. For facilitation of drawing and description, substantially same parts will be denoted by the same numerals as in the case of FIG. 1 and detailed explanation of which will be omitted from the following description. In this second embodiment, the indicator pointer 12 is formed with a blind bore 52 having the shape as well shown in FIG. 4, to which the connector 14 is forcedly disposed. The blind bore 52 has a flat wall 54 which is inclined at about 45 degrees with respect to the longitudinal axis of the pointer 12, as shown. The light emitting diode 26 is affixed to the first conductive cylindrical member 32 to electrically connect at its one terminal to the member 32. Designated by numeral 56 is a lead wire for connecting the other terminal of the diode 26 to the second conductive cylindrical member 34.

With this, when the diode 26 is electrically energized to light, light rays from the diode 26 are reflected rightwardly in the drawing at the inclined wall surface 54 to direct toward the top end portion of the pointer 12 in a manner as indicated by the lines "L". With using this measure, better lighting effect is given in the pointer 12.

With the above description, it will be appreciated that the movement of the pointer 12 is smoothly and sensitively made and further the lightening of the pointer 12 is effectively given according to the invention.

It should be noted that the foregoing description shows only two embodiments, various modifications are apparent to those skilled in the art without departing from the scope of the invention which is only limited by the appended claims.

What is claimed is:

1. An indicator gauge having a spindle of a movement, a dial board substantially perpendicular to said spindle, and a viewing in front of said dial board, said indicator gauge comprising:
    an indicator pointer of a transparent material arranged between said dial board and said viewing window, said pointer being formed with first and second surfaces which respectively face said dial board and said viewing window, said first surface being matted;
    illuminating means disposed in said pointer for emitting light rays when electrically energized;
    a first conductive cylindrical member mounted on an end of said spindle;
    a second conductive cylindrical member coaxially and spacedly disposed around said first conductive member to form therebetween a tubular clearance, said first and second conductive cylindrical members being individually and electrically connected to said illuminating means;
    a tubular insulating member tightly disposed in said tubular clearance, a unit of said first and second conductive cylindrical members and said insulating member being forcedly disposed in a blind bore formed in said pointer;
    a plurality of conductive pins having respective enlarged head portions which are forcedly disposed in a circular groove formed in an exposed end of said second conductive cylindrical member;
    a tubular insulating member disposed about said spindle to put on the cylindrical surface thereof said pins;
    a first spiral spring disposed about said spindle and connecting at its inside end to said spindle; and
    a second spiral spring disposed about said pins and connecting at its inside end to at least one of said pins,
    said first and second spiral springs being individually and electrically connected to an electrical power source.

2. An indicator gauge as claimed in claim 1, further comprising cover means affixed to said second surface of said pointer to conceal said illuminating means.

3. An indicator gauge as claimed in claim 1, in which said pointer is formed at the other end thereof with an inclined section where the light rays from said illuminating means are reflected toward said viewing window.

4. An indicator gauge as claimed in claim 1, in which said illuminating means is disposed in said blind bore of said pointer.

5. An indicator gauge as claimed in claim 4, in which said blind bore has a flat surface which is inclined with respect to the longitudinal axis of said pointer so that light rays from said illuminating means are reflected at said flat surface to be directed toward said matted surface on said first surface of said pointer.

6. An indicator gauge as claimed in claim 5, in which said flat surface is inclined at approximately 45 degrees with respect to said longitudinal axis of said pointer.

7. An indicator gauge as claimed in claim 4, in which said illuminating means is attached to said first conductive cylindrical member.

8. An indicator gauge as claimed in claim 2, in which said cover means is opaque paint.

* * * * *